US007707092B1

(12) United States Patent
Freed

(10) Patent No.: US 7,707,092 B1
(45) Date of Patent: Apr. 27, 2010

(54) SYSTEM AND METHOD FOR RANKING INVESTMENT PERFORMANCE

(75) Inventor: Marc S. Freed, 243 Eichybush Rd., Kinderhook, NY (US) 12106

(73) Assignees: Marc S. Freed, Kinderhook, NY (US); Lyster Warson & Co., New York, NY (US)

( * ) Notice: Subject to any disclaimer, the term of this patent is extended or adjusted under 35 U.S.C. 154(b) by 1151 days.

(21) Appl. No.: 10/870,204

(22) Filed: Jun. 17, 2004

(51) Int. Cl.
*G06Q 40/00* (2006.01)
(52) U.S. Cl. ..................... 705/36 R
(58) Field of Classification Search .................. None
See application file for complete search history.

(56) References Cited

OTHER PUBLICATIONS

Warwick, Ben. The Handbook of Risk. John Wiley & Sons. pp. 80-82; 112-114; 143-145.*
Sharpe, William F. Mutual Fund Performance. The Journal of Business. vol. 39, No. 1, Part 2: supplement on Security Prices. Jan. 1966. pp. 119-138.*
Warwick, Ben. The Handbook of Risk. John Wiley & Sons. 2003. pp. 80-82; 109-114; 143-145 and 208.*

* cited by examiner

*Primary Examiner*—Jason M Borlinghaus
(74) *Attorney, Agent, or Firm*—Pryor Cashman LLP; Andrew S. Langsam

(57) ABSTRACT

A method for ranking relative investment performance is provided. The method uses risk measured by standard deviation of return over time and return data (over risk-free returns) to compare an investment to a particular market to which the investment belongs. The method ranks the investments based on a mathematical computation involving orthogonal distance between each investment and the line defined by the overall market within which the investment operates.

5 Claims, 4 Drawing Sheets

FIG. 1 - Prior Art

ORTHOGONAL INDEX SCORE

| Hedge Fund Strategy | | LONG SHORT EQUITY | | | | | |
|---|---|---|---|---|---|---|---|
| Report Dates | START | 7/2000 | END | 10/2003 | RF Rate | 2.92% | |
| Strategy Market Data | Risk | 7.31% | Return | 5.00% | Sharpe | 0.29 | |
| INDIVIDUAL FUND DATA | | | | | | | |
| FUND NAME | Risk | Return | Sharpe | Sharpe Rank | Beta | RF-Norm | OIS | OIS Rank |
| Pentagram Equity Fund, L.P. | 22.87% | 41.91% | 1.70 | 7 | 43.75 | 45.20% | 31.26% | 1 |
| Elm Ridge Value Partners, L.P. | 14.00% | 29.72% | 1.91 | 5 | 46.57 | 30.23% | 21.95% | 2 |
| Bricoleur Enhanced, L.P. | 12.76% | 24.44% | 1.69 | 8 | 43.48 | 25.01% | 17.21% | 3 |
| Greenlight Capital L.P. | 10.15% | 23.31% | 2.01 | 4 | 47.70 | 22.77% | 16.84% | 4 |
| Atlas Capital LP | 7.53% | 21.56% | 2.48 | 1 | 52.16 | 20.10% | 15.87% | 5 |
| SC Fundamental Value Fund L.P. | 7.60% | 20.35% | 2.29 | 3 | 50.60 | 19.02% | 14.69% | 6 |
| Amici Associates, L.P. | 9.83% | 18.31% | 1.57 | 9 | 41.58 | 18.26% | 12.12% | 7 |
| Shaker Investments L.P. | 15.35% | 19.57% | 1.08 | 13 | 31.47 | 22.65% | 11.82% | 8 |
| Sonic Fund I, LP | 21.41% | 19.80% | 0.79 | 15 | 22.39 | 27.26% | 10.39% | 9 |
| Everglades Partners, L.P. | 6.54% | 15.42% | 1.91 | 6 | 46.51 | 14.11% | 10.23% | 10 |
| Basswood Opportunity Partners, L.P | 10.19% | 14.73% | 1.16 | 12 | 33.36 | 15.59% | 8.58% | 11 |
| Ascend Partners, L.P. | 3.97% | 12.07% | 2.31 | 2 | 50.70 | 9.97% | 7.71% | 12 |
| Longwood Partners, L.P. | 21.33% | 16.67% | 0.64 | 19 | 16.94 | 25.37% | 7.40% | 13 |
| Baker Street Capital Partners | 5.95% | 10.52% | 1.28 | 11 | 36.09 | 9.65% | 5.68% | 14 |
| Blue Coast Partners, L.P. | 6.32% | 9.66% | 1.07 | 14 | 31.01 | 9.24% | 4.76% | 15 |
| Wilson Partners, L.P. | 17.70% | 12.67% | 0.55 | 22 | 13.01 | 20.21% | 4.55% | 16 |
| Canadian Aggressive Hedged, LP | 17.13% | 11.99% | 0.53 | 24 | 12.05 | 19.38% | 4.05% | 17 |
| Cumberland Partners | 15.97% | 11.52% | 0.54 | 23 | 12.45 | 18.14% | 3.91% | 18 |
| Whitney Partners, LP | 3.27% | 7.77% | 1.48 | 10 | 40.13 | 5.84% | 3.77% | 19 |
| PCM Partners L.P. | 22.61% | 12.51% | 0.42 | 26 | 7.14 | 24.56% | 3.05% | 20 |
| Okumus Opportunity Partners, L.P. | 42.61% | 18.10% | 0.36 | 31 | 3.76 | 45.23% | 2.97% | 21 |
| Bricoleur Partners II, L.P. | 7.56% | 7.98% | 0.67 | 17 | 17.95 | 9.10% | 2.80% | 22 |
| Bricoleur Partners, L.P. | 7.58% | 7.71% | 0.63 | 20 | 16.45 | 8.97% | 2.54% | 23 |
| Edgewood Partners, LP | 11.99% | 8.68% | 0.48 | 25 | 9.79 | 13.30% | 2.26% | 24 |
| Ivory Capital, LP | 6.14% | 6.88% | 0.64 | 18 | 16.96 | 7.31% | 2.13% | 25 |
| Circle T Partners | 12.76% | 8.07% | 0.40 | 28 | 6.13 | 13.76% | 1.47% | 26 |
| Balboa Fund, L.P. | 3.16% | 5.31% | 0.76 | 16 | 21.26 | 3.96% | 1.44% | 27 |
| Sterling Equity Partners, L.P. | 16.59% | 9.09% | 0.37 | 30 | 4.53 | 17.70% | 1.40% | 28 |
| Robbins Opportunity Fund, L.P. | 4.71% | 5.60% | 0.57 | 21 | 13.77 | 5.42% | 1.29% | 29 |
| Bourgeon Partners L.P. | 9.83% | 6.82% | 0.40 | 29 | 5.77 | 10.57% | 1.06% | 30 |
| Ram Capital L.P. | 6.22% | 5.52% | 0.42 | 27 | 6.85 | 6.74% | 0.80% | 31 |
| Jupiter Fund L.P. | 11.10% | 6.43% | 0.32 | 33 | 1.67 | 11.64% | 0.34% | 32 |
| Dorado Capital Partners, L.P. | 5.26% | 4.60% | 0.32 | 32 | 1.84 | 5.52% | 0.18% | 33 |
| Bull Run Fund, L.P. | 2.27% | 3.47% | 0.24 | 35 | (2.19) | 2.33% | -0.09% | 34 |
| Tarpon Partners. L.P. | 9.27% | 5.37% | 0.26 | 34 | (1.06) | 9.58% | -0.18% | 35 |
| Benchmark Partners, L.P. | 11.15% | 5.47% | 0.23 | 36 | (2.97) | 11.44% | -0.59% | 36 |
| Highline Capital Partners | 7.35% | 3.79% | 0.12 | 37 | (9.09) | 7.40% | -1.17% | 37 |
| Libre Partners L.P. | 13.46% | 3.97% | 0.08 | 40 | (11.38) | 13.50% | -2.66% | 38 |
| Manley Investment Partners L.P. | 15.74% | 4.52% | 0.10 | 39 | (10.04) | 15.83% | -2.76% | 39 |
| P.A.W .Partners, L.P. | 6.07% | 1.70% | (0.20) | 48 | (27.25) | 6.20% | -2.84% | 40 |
| Larchmont Partners LP | 10.41% | 2.12% | (0.08) | 45 | (20.27) | 10.45% | -3.62% | 41 |
| FK Investments L.P. | 15.54% | 3.33% | 0.03 | 41 | (14.35) | 15.54% | -3.85% | 42 |
| Pequot Partners Fund, L.P. | 10.32% | 1.64% | (0.12) | 46 | (22.93) | 10.40% | -4.05% | 43 |
| ShareVest Partners, L.P. | 24.05% | 5.43% | 0.10 | 38 | (9.89) | 24.18% | -4.15% | 44 |
| Island Drive Partners L.P. | 10.28% | 1.52% | (0.14) | 47 | (23.64) | 10.38% | -4.16% | 45 |
| ACM Research Fund | 8.40% | 0.56% | (0.28) | 50 | (31.56) | 8.73% | -4.57% | 46 |
| Alliance Research Partners L.P. | 8.22% | -1.06% | (0.48) | 59 | (41.70) | 9.14% | -6.08% | 47 |
| Precept Fund, L.P. | 9.96% | -1.23% | (0.42) | 57 | (38.46) | 10.79% | -6.71% | 48 |
| CapitalWorks Cypress Fund II, L.P. | 9.10% | -1.50% | (0.49) | 60 | (41.76) | 10.12% | -6.74% | 49 |
| CapitalWorks Cypress Fund L.P. | 9.27% | -1.65% | (0.49) | 61 | (42.10) | 10.33% | -6.93% | 50 |

Figure 3 (pg. 1)

ORTHOGONAL INDEX SCORE

| | | | | | | | | |
|---|---|---|---|---|---|---|---|---|
| ShareVest Partners, L.P. | 24.05% | 5.43% | 0.10 | 38 | (9.89) | 0.242 | (0.042) | 44 |
| Island Drive Partners L.P. | 10.28% | 1.52% | (0.14) | 47 | (23.64) | 0.104 | (0.042) | 45 |
| ACM Research Fund | 8.40% | 0.56% | (0.28) | 50 | (31.56) | 0.087 | (0.046) | 46 |
| Alliance Research Partners L.P. | 8.22% | -1.06% | (0.48) | 59 | (41.70) | 0.091 | (0.061) | 47 |
| Precept Fund, L.P. | 9.96% | -1.23% | (0.42) | 57 | (38.46) | 0.108 | (0.067) | 48 |
| CapitalWorks Cypress Fund II, L.P. | 9.10% | -1.50% | (0.49) | 60 | (41.76) | 0.101 | (0.067) | 49 |
| CapitalWorks Cypress Fund L.P. | 9.27% | -1.65% | (0.49) | 61 | (42.10) | 0.103 | (0.069) | 50 |
| Apogee Fund | 20.63% | 1.36% | (0.08) | 44 | (20.19) | 0.207 | (0.071) | 51 |
| C & O Investment Partnership L.P. | 22.70% | 1.36% | (0.07) | 43 | (19.78) | 0.228 | (0.077) | 52 |
| Antares European Funds LP | 12.48% | -1.80% | (0.38) | 55 | (36.58) | 0.133 | (0.080) | 53 |
| Bulldog Investment Partners L.P. | 15.11% | -1.42% | (0.29) | 51 | (31.86) | 0.157 | (0.083) | 54 |
| Crestwood Capital Partners, L.P. | 13.90% | -2.09% | (0.36) | 54 | (35.68) | 0.148 | (0.086) | 55 |
| Sabre Partners, L.P. | 12.02% | -3.06% | (0.50) | 62 | (42.31) | 0.134 | (0.090) | 56 |
| KTS Olympus Partners, LP | 12.29% | -3.68% | (0.54) | 63 | (44.11) | 0.140 | (0.097) | 57 |
| Petros Fund, L.P. | 10.44% | -4.39% | (0.70) | 69 | (50.85) | 0.127 | (0.099) | 58 |
| WPG Farber Fund LP | 16.08% | -3.52% | (0.40) | 56 | (37.67) | 0.173 | (0.106) | 59 |
| Schottenfeld Associates | 18.88% | -2.73% | (0.30) | 52 | (32.51) | 0.197 | (0.106) | 60 |
| Meteoric, L.P. | 14.09% | -5.05% | (0.57) | 64 | (45.35) | 0.162 | (0.115) | 61 |
| Southways Partners L.P. | 23.39% | -2.68% | (0.24) | 49 | (29.31) | 0.240 | (0.118) | 62 |
| Senvest Partners, LP | 46.65% | 3.68% | 0.02 | 42 | (14.91) | 0.467 | (0.120) | 63 |
| Versant Partners, LP | 6.22% | -8.45% | (1.83) | 73 | (77.16) | 0.130 | (0.126) | 64 |
| Presidio Partners, L.P. | 14.80% | -6.84% | (0.66) | 68 | (49.27) | 0.177 | (0.134) | 65 |
| Thunder Partners, L.P. | 23.11% | -5.01% | (0.34) | 53 | (34.78) | 0.244 | (0.139) | 66 |
| Hollis Capital Partners L.P. | 11.94% | -8.56% | (0.96) | 72 | (59.73) | 0.166 | (0.143) | 67 |
| SRM Partners LP | 17.45% | -7.17% | (0.58) | 65 | (45.90) | 0.202 | (0.145) | 68 |
| Adams Select Fund, L.P. | 21.82% | -11.18% | (0.65) | 66 | (48.72) | 0.260 | (0.195) | 69 |
| Bennett Lawrence Partners, L.P. | 20.60% | -13.56% | (0.80) | 71 | (54.51) | 0.264 | (0.215) | 70 |
| Keystone Funds, L.P. | 30.86% | -11.43% | (0.46) | 58 | (40.79) | 0.340 | (0.222) | 71 |
| Pegasus Investment Partners | 22.07% | -13.97% | (0.77) | 70 | (53.27) | 0.278 | (0.223) | 72 |
| McKinley Select Partners LP | 31.29% | -17.43% | (0.65) | 67 | (48.88) | 0.373 | (0.281) | 73 |

Figure 3 (pg. 2)

SYSTEM AND METHOD FOR RANKING INVESTMENT PERFORMANCE

FIELD OF THE INVENTION

The present invention is directed towards financial analysis, and more particularly towards the ranking of relative investment performance.

DESCRIPTION OF THE PRIOR ART

For decades, economists, investors, and the general public have attempted to perfect a strategy to maximize their returns on investments. Although individual stock, bond, or other investment vehicle performance is generally considered unpredictable, in that past performance is not necessarily an indication of future performance, nevertheless investors look to past performances and relative returns of investment vehicles in making current investment decisions. In view of the unpredictability of performance, many factors have been considered to minimize risk while maximizing returns on any given investment. Many of these systems, methods, and models have failed to predict the market's behavior and/or determine the best manner to invest one's money. Management of portfolios of assets has historically emphasized maximizing the overall return on assets with the objective of minimizing risk and at least outperforming the general market for the same type or considered less-risky investments.

Many investors hire professional money managers to invest their financial assets on their behalf. Mutual funds account for most such investments and for 2003, are believed to total approximately seven trillion dollars in the U.S. alone. Approximately $750 billion more is believed invested in financial vehicles known as hedge funds. The relative performance of these mutual and hedge funds is often scrutinized and ranked by third parties including financial advisors, academic students of finance, and the financial media. Undoubtedly, investors use these rankings to identify superior and inferior money managers and to use the results to help determine with whom to possibly invest their monies. Since past market conditions are the same for all, relative performance can be an important factor in considering new investments and in determining which fund was best able to have a greater rate of return with relatively low risk.

Individual investments, even mutual or hedge fund performance, are difficult to compare to each other based only on their returns without examining other factors. In the past, investments were usually tracked and compared to each other solely on the basis of their generated returns. Thus, a fund or investment that produced annualized returns of, for example, 34% for the past year, was considered to have done 16% "better" than another fund or investment vehicle that returned 18% during the same year. This would certainly be true if similar funds or investments were compared, i.e., long equities to long equities, or small cap mutual funds to other small cap mutual funds. Yet, this type of comparison can be misleading because a comparison of only "returns" does not take into account the varying levels of risk and the fluctuations of the returns for the time period in question. The fund with a greater historical return may not be as attractive to a conservative investor as the fund with a slightly lesser return having a substantially lesser level of risk or volatility. It is generally accepted that the greater the potential return of an investment, the greater the potential for loss. Thus, investors also consider the risk level of a particular fund or investment vehicle in conjunction with its return to make a more informed and educated decision about a future investment. Past returns which reflect risks may be considered by many investors in making decisions as to prospective investments. For example, an investor may choose, for the same annual return rate of the past year, a fund which has the lower risk or volatility of the return or may decide that a fund so outperforms other funds and the market that its increased risk or return volatility is justified.

The relationship between risk and return forms the basis of an investment model known as the Modern Portfolio Theory (MPT). The Modern Portfolio Theory was derived from the work of Harry Markowitz (in 1952) and William F. Sharpe (in 1963), who shared the 1990 Nobel Prize in Economics for their work on the "portfolio problem." The "portfolio problem" can be partially explained in simple terms here by considering two assets, A and B. For example, assume Asset A has a particular risk and return associated with it. Asset B, has a lower risk yet, correspondingly, a lower return. If an investor puts all his money into asset A, he can expect the return and risk associated with the underlying asset or investment. Similarly, if he invests entirely in asset B, he can expect the risk and return associated with that asset. However, by splitting the investment between the two assets (whether equally or not), the risk and return of the overall portfolio should change dramatically.

The return and risk or volatility of a portfolio containing both assets A and B is a function of the included assets but the relationship is not necessarily linear. In fact, for most real world assets, certain portfolios containing both asset A and asset B can exhibit a lower risk for a given return than either of the underlying assets. The benefit of this type of diversification follows from the fact that the financial performance of the two assets are not directly linked to each other and in general are imperfectly correlated. The optimal mix of asset A and asset B in a single portfolio lies along a curve called the "efficient frontier." A methodology exists which can be used to compute the efficient frontier to help the investor try to develop a strategy for maximizing return while minimizing risk. The mathematics used to measure risk and return and to compute the efficient frontier is discussed at length in numerous financial management textbooks, including Investments, authored by William F. Sharpe. However, a brief explanation of the methods for measuring risk and return are useful to appreciate certain aspects of the present invention.

Generally, each financial asset has an associated risk and a corresponding return which must be defined for purposes of computation. To compare two assets, a standardized measure of risk and return must be developed. The literature defines certain measures, e.g., alpha, beta, market return and risk free return. Beta is the normalized measure of asset risk. An asset which "moves" exactly in proportion with the market has a beta of 1.0. An asset which has half the risk of the market or moves only half as much as the market has a beta of 0.5. An asset which doesn't move at all with the market has a beta of risk of zero. Thus, beta is a measure of the covariance of an asset's return compared with the market. In other words, beta is a volatility measure that quantifies the movements of a security or fund relative to those of a benchmark index or the market and it reveals how much an investor can expect a fund to move as the market moves. Risk free return is the measure of the return of a considered, risk free investment such as U.S. treasury bills (beta=approximately 0.0). Return is usually defined as the percentage change in asset value over the holding period for the asset.

Alpha is used as a measure of the amount by which the return on an asset exceeds or is beneath the return of a market benchmark having the same level of risk as the asset. Many texts describe alpha as how "mispriced" an asset is. Essentially, alpha is the difference between the return one would expect from a fund, given its beta, and the return that is actually produced. If a fund returned more than its beta would have predicted, it has a positive alpha. On the other hand, a fund that returned less than its beta would have predicted, has a negative alpha. The higher the risk level for a particular fund, the greater the return it must generate in order to produce the same high alpha. Values for alpha are expressed as a percent per time period.

It is well known that an "efficient" portfolio can be combined with a risk free investment to create an optimal portfolio for a defined level of risk. An efficient portfolio calculator can compute the efficient frontier for a portfolio of assets if the expected future values of these parameters are known or can be estimated. However, these efficient frontier calculations are quite sensitive to the values of the expected return attributed to the assets, as well to their correlation or covariance.

The Sharpe ratio seeks to quantify a fund's return in excess of a risk-free, or virtually guaranteed, investment (the 90-day T-bill for example), relative to its risk or period to period volatility or change of return. However, unlike alpha, which is calculated using beta as a risk measure, the Sharpe ratio uses the standard deviation of the return of an investment over time as its volatility or risk component. The definition of the Sharpe ratio or S of an investment x is:

$$S(x) = (r_x - R_f)/StdDev(x)$$

where:

x is the investment vehicle;

$r_x$ is the average annual rate of return of the investment;

$R_f$ is the best available rate of return of a "risk-free" security (i.e. T-bill) for the same time period; and $StdDev(x)$ is the standard deviation of $r_x$ over the same time period.

The Sharpe ratio is considered a direct measure of reward-to-risk. The higher the Sharpe ratio for a particular fund or type of investment, the higher the fund's return (relative to the amount of investment risk taken). Thus, if a fund has high volatility, i.e., it evidences a high standard deviation, the denominator of the Sharpe ratio is higher; therefore, the higher the numerator (actual return over excess return) must be for the fund to maintain a large Sharpe ratio. Conversely, a fund with relatively mild returns over a risk free return will have a relatively small numerator value; yet, if its volatility is also low, a small denominator can still result in a relative large Sharpe ratio. Sharpe ratio is thus considered a valuable measure of relative investment performance.

The Sharpe ratio has a major advantage over alpha because standard deviation measures the volatility of a fund's return over time. This eliminates the problem of index correlation. As aforementioned, the accuracy of a fund's alpha and beta values depends on their correlation with the market benchmark index. Alpha value comparisons can be virtually meaningless if two funds have different correlation levels. Yet, it is important to note that a Sharpe ratio, expressed as a raw number, may be compared from one fund to another fund (or group of funds) to gain a better understanding of their risk-adjusted returns relative to other investment options and their period to period return volatility.

Using the Sharpe ratio, an investor can gain a better understanding of risk and return to make educated financial decisions. If an investor limits himself to low-risk securities, he'll be limiting himself to investments that tend to have relative low rates of return. Thus, it is preferred to include some higher growth, higher risk securities in the portfolio, but to combine them in a smart way, so that some of their fluctuations tend to cancel each other out. In statistical terms, it is considered best to find a combined standard deviation (or risk/volatility) that's low, relative to the standard deviations of the individual securities. The result will more likely give a higher average rate of return, with less of the harmful and stressful fluctuations.

Traditional investment models, including those using the Sharpe Ratio, only calculate a measure of risk and return relative to a risk-free investment. While this measure at least has the virtue of combining two key factors, risk (measured by standard deviation of return over time) and return (actual return over risk-free return) into a single number, it ignores an even more important factor affecting investment returns: the performance of the market in which the fund operates.

Prior financial models seem to have failed to take into account the asset performance relative to a risk-free investment and an additional, market portfolio of assets defined as members of a distinct market. By incorporating only a risk-free rate and the performance of the asset under review in the calculation, the Sharpe ratio provides a measure of investment performance that permits an analyst to rank investments in order of their performance relative to the risk-free rate. However, without taking into account both the risk-free rate and market performance into its calculation, the Sharpe ratio fails to accurately determine the performance of an investment relative to the market in which it operates. By ignoring an additional measure of financial performance, the investor has only a partial understanding of how the fund has performed relative to its particular market.

Thus, a straightforward application of traditional portfolio theory to the selection of investments to form properly risk-targeted, well-diversified investment portfolios seems problematic.

SUMMARY OF THE INVENTION

In view of the foregoing, the present invention modifies traditional investment analysis, performance ranking, and models to permit the consideration of relative performance of funds or investments in a particular market to which the investment belongs, in addition to a risk-free rate. The invention uses the performance values, as reflected below, to create a modeling system and method for measuring and ranking investment performance.

It is an object of the present invention to provide a system and method for defining, measuring, and expressing investment results, including return (over a risk-free return) and consider volatility/risk, that are fully and readily understandable by investors and that provide a meaningful relative measure of risk-adjusted return which can be expressed in an understandable manner.

It is a further object of the present invention to provide a system and method for investment ranking that is based on risk-adjusted performance which combines specific market data in relation to a risk-free investment to enable an investor to make an educated investment decision as between similar investments and fund investment opportunities.

It is still another object of the present invention to provide a system and method that assist in the selection of a portfolio of funds from a given selection of candidate funds, by optimizing the degree of indicated fidelity of the chosen funds to the investor's expressed preferences in terms of return, risk and risk-adjusted return, within a particular market, exhibited for a selected investment holding period in a given period of analysis.

It is another object of the present invention to provide a system and method that are universally applicable to substantially all asset classes and funds, on a uniform basis.

It is a further object of the present invention to provide a system and method that incorporate fundamental principles of modern finance and have superior attributes to existing methods of relative investment evaluation.

Yet another object of the present inventions it to provide a system and method that allow investors to compare the performance of fund managers against the opportunities available to those fund managers in the security markets in which they trade and invest their clients' assets.

The above objects and other objects, features, and advantages of the present invention are readily apparent from the following detailed description of the best mode for carrying out the invention when taken in connection with the accompanying drawings and table.

The method of ranking investment performance includes selecting assets or funds for ranking, providing risk (by use of the standard deviation of the excess return over time) and return data for those assets, constructing a market or fund line based on the data, providing a risk-free line based on a relatively risk-free investment and then computing for each asset or fund its orthogonal distance between the particular fund's risk or volatility and its return on its risk-to-return line and the market line, the distance being on a line which is perpendicular to the market line. The orthogonal distance is then used to rank the particular assets or funds. Based on the orthogonal distance rankings, one may invest in a particular asset or fund. These assets can belong to any type of investment including, but not limited to, mutual funds, hedge funds, and index funds. Additionally, the method of ranking investment performance can be computer-generated. The present invention can be carried out by a computer or a program encoded on a computer with detailed instructions/steps to carry out the method of ranking relative investment performance.

BRIEF DESCRIPTION OF THE DRAWINGS

FIG. 3 is an example of a table showing rankings of a set of mutual funds by using the inventive Orthogonal Index Score. The table also shows the rankings of the mutual funds (in this case traditional long-short equities) using the Sharpe ratio and, thus, by comparison, the different rankings achieved by the different methods.

DETAILED DESCRIPTION OF THE PREFERRED EMBODIMENT AND THE DRAWINGS

The systems and methods of the present invention can be readily applied to all types of investments for which market values and liquidation facilities are available on a regular, periodic basis, including individual securities, mutual funds of all kinds, as well as closed-end funds, variable annuities, commodity funds, separate accounts, comingled funds, hedge funds, and the like. To simplify the terminology in the following discussion, it is assumed that all investments are mutual funds. The chart of FIG. 3 is a table, ranking by use of the inventive OIS and, for comparison, the Sharpe ratio, for a set of mutual funds invested in long-short equities, for the period July 2000 through October 2003.

The present invention allows for a simple and believed superior ranking of fund performances by incorporating an additional factor, the performance of the fund in relation to the then-available market in which the fund operated, in combination with the performance of a risk-free asset. This unique measure of performance can be quantified into a single number, which for descriptive purposes only, will be referred to as the Orthogonal Index Score (OIS). The OIS measures the extent to which a fund has exceeded the market's performance (return) relative to the tradeoff available by increased risk (volatility of return) in the market in which the fund operated.

Figure 1:
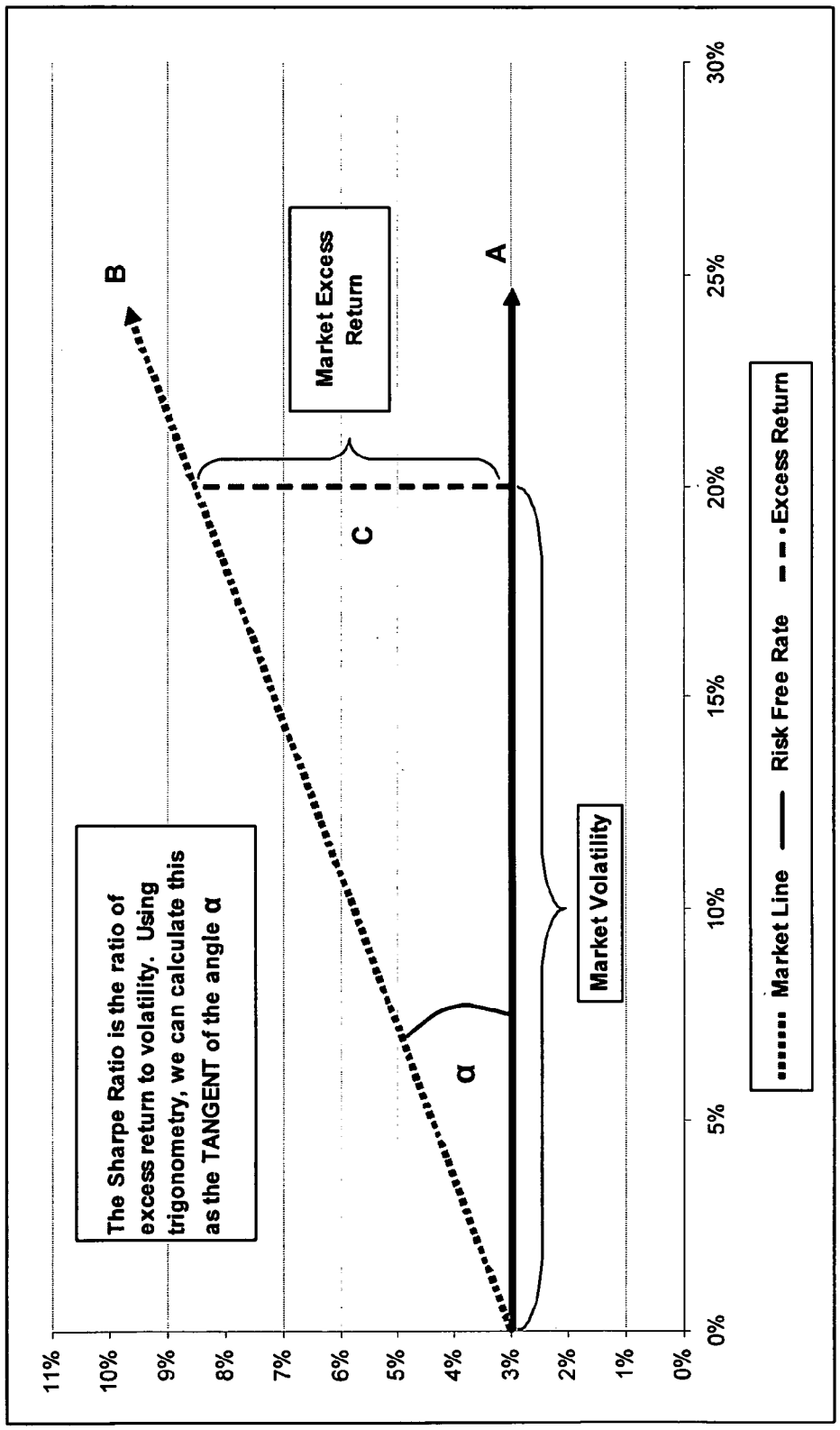
FIG. 1 is a graph illustrating the geometry of the well-known Sharpe ratio.

FIG. 1 is a graph which shows one example of the geometry of the Sharpe ratio. The Sharpe ratio quantifies a fund's return in excess of a risk-free, or virtually guaranteed investment (i.e., the 90-day T-bill), relative to its volatility or risk (measured by standard deviation of the return over time). As shown in FIG. 1, the x-axis is defined as "risk" and the y-axis is defined as "return." More important, the Sharpe ratio (the slope of the defined line) uses standard deviation (sigma) as the measure of risk or volatility. Line A (parallel to the x-axis) represents a risk-free investment, such as the 90-day T-Bill. In this particular graph, for illustrative purposes only, Line A provides a return of 3% at every given risk. Line B represents a hypothetical market-line and how the market generally behaved in relation to risk. It is apparent that as return or investment increases, the risk or volatility also increases. The vertical distance C, between the market line B to the risk-free line A, with the same risk (hence the vertical distance) is the market-excess return. Angle alpha is thus defined as the angle formed between lines A and B. The Sharpe ratio is defined as the slope of Line B, which can be considered as the ratio of the vertical distance from line B extending to the risk free line A, divided by the risk. Stated another way, the Sharpe ratio is the tangent of angle alpha.

Figure 2:
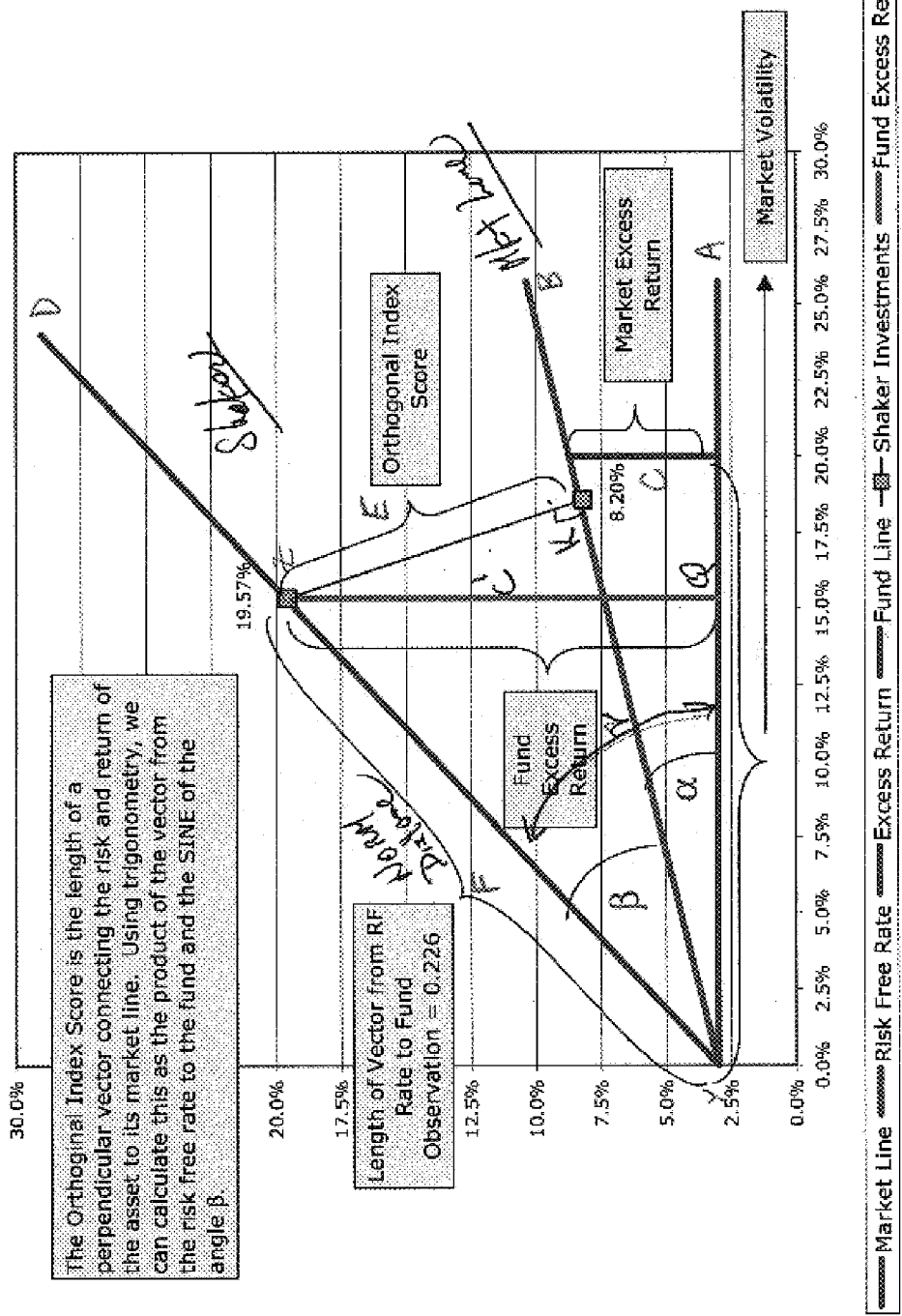
FIG. 2 is a graph showing the geometry of the present invention, referred to herein as the Orthogonal Index Score (OIS).

FIG. 2 shows one example of the geometry of the Orthogonal Index Score (OIS). Similar to FIG. 1, the graph shows line A as a risk-free investment and Line B as the market line, a plotting of all investments or funds by their risk (standard deviation of return over the time period on the x-axis) to their returns (on the y-axis). As mentioned, the Sharpe ratio is the tangent of angle alpha or the distance C in ratio to the distance from the y-axis to the point where C intersects line A (line C being perpendicular to line A, the risk-free line). In addition, the graph shows line D which is the risk-return of a single or specific fund or investment. The fund line D is the performance of a particular fund within the same general market. In this case, for example, we have plotted the return to volatility result of the Shaker Fund Investments, L.P. for the period July 2000 to October 2003, as shown on the table, FIG. 3. As can be seen from the table, this fund showed a return over the time period of 19.57% and a volatility over the same period of 15.35%. This results in a Sharpe ratio of 1.08 (19.57% less 2.92% (risk-free return) divided by 15.35%).

The RF norm, Line segment F, is the distance defined between the point Y (as line D intersects the y-axis) and point Z (which is the point defined by Shaker investments, L.P.'s risk-return performance). The RF norm distance, the hypotenuse of the triangle defined by points Y, Z, and Q can be easily solved for, geometrically. Q is a perpendicular dropped from Z to the risk free rate line A.

FIG. 2 defines the OIS as the distance E, which is the length of the line passing through the point Z of interest, on the line defining the fund being ranked on line D, and its intersection with line B, the market fund line, when E is perpendicular to Line B. This distance is positive when the fund in question has outperformed the market (a greater Sharpe ratio) and is assigned negative distance when the fund has underperformed the market (a relative smaller Sharpe ratio). Referring to FIG. 2, the OIS can be determined arithmetically and/or geometrically. Stated another way, the OIS is simply the length of Line F (extending between the y-axis and point Z) multiplied by the sine of angle beta. The length of Line F is easily determined and the angle beta also can be determined by subtracting angle alpha from angle gamma. There are many other ways to determine E, or the OIS, geometrically. For example, after plotting all funds in the market which are desirably ranked, the slope of the overall market's risk and return performance is established. The risk-free rate of return (the y-intercept) is also known. These, then, provide the equation of the market line or Line B in y=mx+b form. Then, the orthogonal or perpendicular distance between each fund's performance is calculated to Line B. This calculation can be done by recognition that the slope of line E, the distance of which is sought for each fund, is the negative reciprocal of the slope of Line B. Since Point Z is known and the slope of Line E is also now known, then the point K where Line E intersects Line B, can be calculated. Thus, now knowing both data points Z and K, in both dimensions, i.e., x and y, or risk (standard deviation of return over time) and return, the distance of Line E is calculable. Other geometric methods can be used to establish the distance of E, which, according to the present invention, is the OIS for each fund's performance, in comparison to the market's performance. From the funds' OIS, they can be ranked, from greatest to least, to determine relative performance.

Orthogonality is a mathematical concept that refers to vectors that have the property of being linearly independent of one another. In simple terms, this means that one does not account in any way for the behavior of the other. Because one of the purposes of investment analysis is to identify and distinguish individual skill (the manager's performance) from market performance, the notion of an orthogonal index may serve to distinguish the real skill of an investment manager from the random aggregate behavior of a financial market. The present invention uses orthogonality to capture the extent of under-performance or out-performance of an investment in two dimensions. This can also be done by calculating polar coordinates which provide information about both the magnitude of the difference between an investment's return and the risk-free rate (the norm distance or length of the vector) and the direction of a return relative to the return of the market.

FIG. 3 is a chart in table form which shows market data and a number of funds with their associated individual data. The chart is for illustrative purposes only and serves to provide an example of the utility of the present invention. These funds were invested in long and short equity positions. Referring to the table, the top section indicates the type of fund or investment vehicle and general reporting data such as the start and end date of the period in question; the risk-free rate of a particular investment (in this case, for example, 2.92%); the risk or volatility (return change over time) established by the overall market, 7.31%; and the return of that overall market, 5%. A Sharpe ratio of all funds, therefore, was determined as 0.29 defined as:

(Return (5%)−Risk Free Return (2.92%))/Risk (7.31%)           FORMULA I

The main body of the chart lists a number of funds making up the market, which are ranked by the present invention, by using the OIS, and, for comparison, the Sharpe ratio. As the Chart reflects, in the right-most column, OIS is the relative rankings of the calculated OIS distance of each fund, as reflected in the second to last column. The first column is the name of the fund. The next column expresses the amount of risk or volatility (calculated by standard deviation of return over time) evidenced by the particular fund in percentage terms. The Return column shows the percentage of gross return a particular fund has produced for the time period. The Sharpe column expresses the Sharpe ratio of a particular fund and its corresponding Sharpe ranking relative to all of the other funds. The Sharpe ratio is calculated according to Formula I, i.e., the net return over a risk-free investment divided by the funds volatility or risk. The Sharpe ratios are then ranked according to their magnitude in the column entitled Sharpe rank, for comparison purposes to the OIS, the present invention.

The column for the RF angle or beta, is simply the angle between line B (all fund performances in the market) (see FIG. 2) and line D (the fund in question's Sharpe ratio or performance). The RF norm column is the distance between the point Y (where line D intersects the y-axis) and point Z (defined by the funds' actual risk to return performance), known as the norm distance or length F, also depicted in FIG. 2. To determine E or the Orthogonal Index Score, the sine of the RF angle or angle beta is multiplied by the RF norm, or distance F. Other manners of calculating the distance of Line E to arrive at the OIS for each fund are contemplated and within the teaching of the present invention. These OIS distances are shown in the column marked OIS on the chart of FIG. 3. The last column of the chart entitled OIS Rank ranks the funds, by the magnitude of the OIS distances with the highest positive OIS being ranked first.

It will be seen that the fund called Atlas Capital LP has the highest ranking according to its Sharpe ratio and, yet, the Pentagram Equity Fund, LP has the largest positive OIS and hence a higher OIS ranking. This is because Pentagram, while taking more risk and having shown more return volatility (hence its Sharpe ratio was lower) recognized that the increased risks were justified and the manner of best yielding a higher return (compare 21+% for Atlas to 41+% for Pentagram) for the available market conditions. The OIS ranking shows a difference to that of the Sharpe Index ranking because it takes into account that, for example, by taking more risk, a significantly higher return was achievable in those market conditions. Under this method of ranking relative performance, the managers of Pentagram had the "best" results. While their volatility was higher, they achieved superior returns compared to the market's available opportunities and bested all other performers for that market.

It will be understood that various details of the invention may be changed without departing from the scope of the invention. Furthermore, the foregoing description is for the purpose of illustration only and not for the purpose of limitation.

The invention claimed is:

1. A method of using a computer for determining relative investment performance of individual investments of a set of investments comprising the steps of:
   (a) selecting a set of investments, each having a name and being in existence for a period of time;
   (b) obtaining return on investment data ($R_I$) and the volatility thereof ($\sigma_I$) for each of said investments of said set of investments over said given period of time wherein said volatility is based on the standard deviation of said return on investment over predetermined intervals of said period of time;
   (c) imputing said datapoints ($\sigma_I, R_I$) for each of said set of investments from said step (b) into a computer and plotting the same onto a Cartesian set of axis corresponding to Volatility or $\sigma$ (on a first axis) and Return on Investment or R (on the second axis) and coordinating the datapoint ($\sigma_I, R_I$) defined by the performance of each of said set of investments to said name of each of said investments from said set of investments;

(d) determining the return on investment ($R_M$) and volatility ($\sigma_M$) performance of a market benchmark investment for said set of investments for at least one similar investment to said set of investments for said same period of time, and imputing that datapoint ($\sigma_M$ and $R_M$) into said computer and plotting the same onto said Cartesian set of axis;

(e) determining the return on investment ($R_{RF}$) for a substantially risk-free investment ($\sigma_{RF}=0$) for substantially the same period of time, and imputing this datapoint into said computer and onto said Cartesian set of axis;

(f) determining via said computer the linear and functional relationship (R as a function of $\sigma$) between said performance (return on investment ($R_M$) and volatility ($\sigma_M$)) of said market benchmark investment and said return ($\sigma_{RF}=0$, $R_{RF}$) on the investment for said substantially risk-free investment, (g) calculating via said computer a series of orthogonal indices ($\sigma_{OI-I}$, $R_{OI-I}$) corresponding to a datapoint for each of said set of investments satisfying said linear and functional relationship determined in accordance with said step (f) and also satisfying a linear function which defines the functional relationship between said $\sigma_I$ and $R_I$ and yet has a negative reciprocal slope to the slope of said linear and functional relationship determined in accordance with said step (f);

(h) using said $\sigma_I$ and $R_I$ for each of said set of said investments and each of said corresponding Orthogonal Indices ($\sigma_{OI-I}$, $R_{OI-I}$) determined in said step (g) and calculating by said computer the distance between each of said datapoints ($\sigma_I$, $R_I$) for each of said set of investments to said corresponding Orthogonal Indices ($\sigma_{OI-I}$, $R_{OI-I}$) for each of said set of investments as determined in accordance with said step (g);

(i) defining said linear and functional relationship determined in accordance with said step (f) on said Cartesian set of axis as a new positive and negative dividing axis (z);

(j) having said computer:
 (1) assign a positive value to said distance value determined in accordance with said step (h) if said return on investment and volatility datapoint of said investment ($\sigma_I$ and $R_I$) is superior, i.e., above said new axis (z);
 (2) assign a zero value to said distance value determined in accordance with said step (h) if said return on investment and volatility datapoint of said investment ($\sigma_I$ and $R_I$) is on said new axis (z); and
 (3) assign a negative value to said distance value determined in accordance with said step (h) if said return on investment and volatility of said investment ($\sigma_I$ and $R_I$) is inferior, i.e., below said new axis (z); and (k) having said computer order and display said set of investments based on the ordering of said distance values in relative arithmetic magnitude and providing said order and display in association with said name of each of said investments.

2. A method as claimed in claim 1, wherein said set of investments are mutual funds.

3. A method as claimed in claim 1, wherein said set of investments are hedge funds.

4. A method as claimed in claim 1, wherein said set of investments are indexed funds.

5. A method as claimed in claim 1 further comprising the step of allocating a portion of available funds into one or more of said set of investments based on said order and display of said set of investments as set forth in said step (k).

* * * * *